May 9, 1933.  W. L. CHURCH  1,908,221

BLOW-OUT PREVENTER

Filed July 1, 1930

Inventor
Walter L. Church

By
Hardway Rather
Attorneys

Patented May 9, 1933

1,908,221

UNITED STATES PATENT OFFICE

WALTER L. CHURCH, OF HOUSTON, TEXAS

BLOW-OUT PREVENTER

Application filed July 1, 1930. Serial No. 465,105.

This invention relates to new and useful improvements in blow out preventer.

One object of the invention is to provide apparatus of the character described specially adapted to form a seal between the casing or outer pipe in a well bore and a drill stem or other inner pipe therein and a particular feature of the invention resides in the provision of a novel type of valve structure which is adjustable to maintain a close fit at all times around the inner pipe to prevent the escape of fluid from the well between said pipes.

Another object of the invention is to provide a blow out preventer of the character described having radially movable valves therein whose inner ends are shaped to closely fit around the inner pipe and are equipped with adjustable packing members formed of yieldable material and which may be from time to time adjusted relative to the valves so as to take up wear and prevent leakage about the inner pipe.

With the above and other objects in view, the invention has particular relation to certain novel features of construction, operation and arrangement of parts, an example of which is given in this specification and illustrated in the accompanying drawing wherein.

Figure 1:
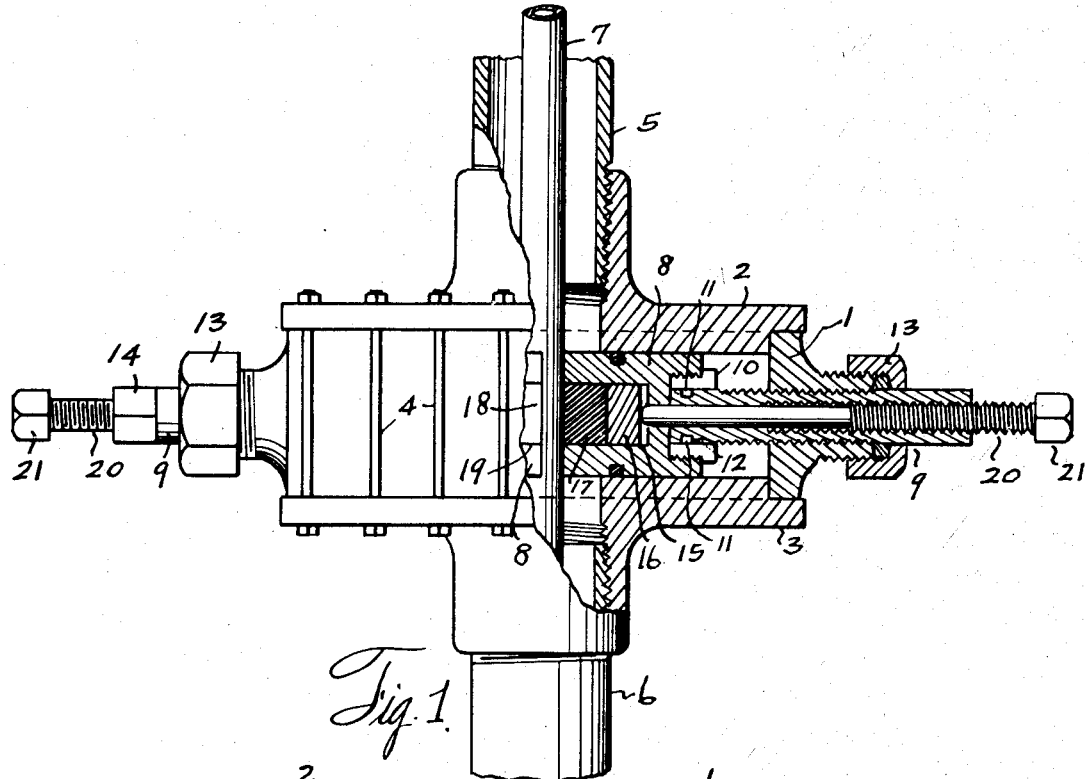
Figure 1 shows a side elevation of the apparatus.
Figure 2:
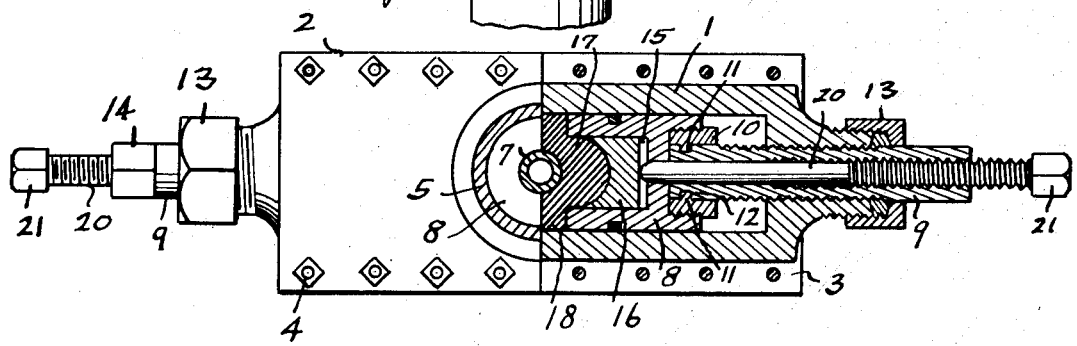
Figure 2 shows a plan view, shown partly in section.
Figure 3:
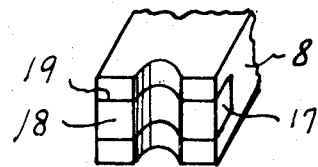
Figure 3 shows a fragmentary perspective view of the valve.

In the drawing, the numeral 1 designates a casing, preferably rectangular in horizontal sectional contour, said casing having the upper and lower end plates, 2, 3 which are clamped securely in position by the clamp bolts 4. The upper and lower sections 5, 6 of the outer pipe are connected to the upper and lower plates, 2, 3 as shown.

A drill stem, as 7, or any other inner pipe works within the outer pipe. Fitted snugly in the casing 1 are the oppositely disposed slide valves 8, 8. Tubular operating shafts 9, 9 are threaded through the opposite ends of the casing 1 and their inner ends have swiveling connections with the valves 8. A split bushing 10 is threaded into the outer end of each valve and is provided with the inwardly extending studs 11, 11 which work in the annular grooves 12 around the inner ends of said shafts 9 and provide said swiveling connections. The shafts 9 work through stuffing boxes 13 carried by the casing 1. The outer ends of the shafts 9 are polygonal as at 14 to receive a wrench through which said shafts 9 may be turned and the valves adjusted as desired. The inner end of each valve 8 has a deep socket 15 in which there is fitted an adjusting block 16 whose outer end is concaved. Fitted into said concaved ends of said blocks are the resilient bearing members 17 whose ends 18 are outwardly turned and fitted into the end grooves 19 of the respective valves. The confronting faces or ends of the valves 8 are shaped to conform to and closely fit around the inner pipe 7.

When it is desired to close the space between the outer and inner pipes, the shafts 9 may be turned to force the valves inwardly until their inner ends abut and surround the inner pipe, so as to form a fluid tight seal about the inner pipe. Provision has been made for adjusting the packing members 17 inwardly to take up the wear and to maintain a tight fit about the inner pipe, should a leak develop. For this purpose an adjusting rod 20 is threaded through each shaft 9 with its inner end resting against the outer end of the corresponding block 16. The outer ends of the rods 20 have the polygonal heads 21 to receive a wrench for adjusting purposes. After the valves have been adjusted inwardly about the inner pipe until their inner ends abut the wear on the packing members 17 may be taken up, or any leak that may develop between them and the inner pipe may be stopped by adjusting the rods 20 inwardly to force said packing members more closely about the inner pipe, and this adjustment may be repeated from time to time as the circumstances may necessitate until the said members 17 are worn out and thereupon they may be replaced with new ones and the apparatus restored to full efficiency.

The drawing and description disclose what is now considered to be a preferred form of the invention, by way of illustration only, while the broad principle of the invention will be defined by the appended claim.

What I claim is:

A blow out preventer including a casing adapted to be connected to an outer pipe, oppositely working slide valves therein whose facing ends are shaped to conform to the contour of and to fit around an inner pipe, adjusting shafts having threaded connections with the casing and whose inner ends have swivelling connections with the respective valves and whose outer ends are acessible outside of the casing, the inner end of each valve being provided with a deep socket, an adjusting block fitted into each socket whose inner end is formed with a flat face and whose outer end is recessed, resilient packing members fitted into the recessed ends of said blocks, said packing members having lateral extensions through the valves which fit against the opposing walls of the casing said packing members being shaped to surround the inner pipe, adjusting rods threaded through said shafts and whose inner ends abut said faces, the outer ends of said rods being accessible outside of the casing, said rods forming means for adjusting said packing members independently of the valves.

In testimony whereof I have signed my name to this specification.

WALTER L. CHURCH.